(12) United States Patent
Dobashi et al.

(10) Patent No.: US 12,291,212 B2
(45) Date of Patent: May 6, 2025

(54) DRIVING FORCE CONTROL DEVICE

(71) Applicant: TOYOTA JIDOSHA KABUSHIKI KAISHA, Toyota (JP)

(72) Inventors: Kohei Dobashi, Susono (JP); Yasushi Dohnoue, Seto (JP); Satoshi Yamanaka, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 17/932,438

(22) Filed: Sep. 15, 2022

(65) Prior Publication Data

US 2023/0143408 A1  May 11, 2023

(30) Foreign Application Priority Data

Nov. 11, 2021 (JP) .................................. 2021-184406

(51) Int. Cl.
| | |
|---|---|
| *B60W 40/105* | (2012.01) |
| *B60W 40/10* | (2012.01) |
| *B60W 50/00* | (2006.01) |
| *B60W 50/08* | (2020.01) |
| *B60W 50/10* | (2012.01) |
| *B60W 60/00* | (2020.01) |

(52) U.S. Cl.
CPC ...... *B60W 40/105* (2013.01); *B60W 40/1005* (2013.01); *B60W 2050/0096* (2013.01); *B60W 50/087* (2013.01); *B60W 50/10* (2013.01); *B60W 60/0053* (2020.02); *B60W 2720/106* (2013.01)

(58) Field of Classification Search
CPC .......... B60W 40/105; B60W 40/1005; B60W 2720/106; B60W 2050/0096; B60W 50/087; B60W 60/0053; B60W 50/10
USPC .......................................................... 701/93
See application file for complete search history.

(56) References Cited

U.S. PATENT DOCUMENTS

| | | | |
|---|---|---|---|
| 10,967,860 B2 * | 4/2021 | Takemori | B60W 30/182 |
| 11,407,420 B2 * | 8/2022 | Kubo | B60W 50/14 |
| 2018/0173228 A1 * | 6/2018 | Wada | B60W 30/182 |

(Continued)

FOREIGN PATENT DOCUMENTS

| | | |
|---|---|---|
| JP | 3424514 B2 * | 7/2003 |
| JP | 2019-93924 A | 6/2019 |
| JP | 2021-79746 A | 5/2021 |

*Primary Examiner* — Russell Frejd
*Assistant Examiner* — Preston Jay Miller
(74) *Attorney, Agent, or Firm* — Oblon, McClelland, Maier & Neustadt, L.L.P.

(57) ABSTRACT

In a driving force control device, a driving force is controlled based on an override driving force characteristic specifying a target acceleration according to a vehicle speed, an accelerator pedal position, and a traveling resistance to a vehicle, a longitudinal acceleration at a fully closed accelerator pedal position is higher in an override driving force characteristic than in a manual-driving-mode driving force characteristic, and a graph representing a relation between the accelerator pedal position and the longitudinal acceleration in the override driving force characteristic and a graph representing a relation between the accelerator pedal position and the longitudinal acceleration in the manual-driving-mode driving force characteristic intersect at a specific accelerator pedal position different from a fully closed position and a fully opened position.

2 Claims, 10 Drawing Sheets

(56) References Cited

U.S. PATENT DOCUMENTS

| | | | |
|---|---|---|---|
| 2018/0186352 A1* | 7/2018 | Goto | B60T 8/1769 |
| 2019/0152491 A1* | 5/2019 | Arai | B60W 50/082 |
| 2019/0202460 A1* | 7/2019 | Ishikawa | B60W 10/06 |
| 2019/0204828 A1* | 7/2019 | Ishikawa | G05D 1/0223 |
| 2021/0094529 A1* | 4/2021 | Mizoguchi | B60W 60/0053 |
| 2023/0044145 A1* | 2/2023 | Cho | B60W 60/0057 |

* cited by examiner

DRIVING FORCE CONTROL DEVICE

CROSS-REFERENCE TO RELATED APPLICATION(S)

The present application claims priority to and incorporates by reference the entire contents of Japanese Patent Application No. 2021-184406 filed in Japan on Nov. 11, 2021.

BACKGROUND

The present disclosure relates to a driving force control device.

Japanese Laid-open Patent Publication No. 2021-079746 discloses a technique for setting a mode shifting driving force characteristic by determining a driver's intention to accelerate when override is detected.

However, the technique disclosed in Japanese Laid-open Patent Publication No. 2021-079746 has a problem that a sudden change in the driving force occurs when a mode shifting driving force characteristic is switched to a manual-driving-mode driving force characteristic.

SUMMARY

There is a need for providing a driving force control device capable of controlling a sudden change in the driving force.

According to an embodiment, a driving force control device is configured to cause a vehicle to travel by switching between a manual driving mode for controlling a driving force of the vehicle based on a manual-driving-mode driving force characteristic specifying a vehicle speed, an accelerator pedal position, and a longitudinal acceleration of the vehicle to be generated according to the accelerator pedal position as a target acceleration and an automated driving mode for controlling the driving force by automatic control without depending on an accelerator pedal operation by a driver, and configured to change, when the automated driving mode is shifted to the manual driving mode, the driving force from a driving force generated in the automated driving mode to a driving force generated in the manual driving mode. Further, when the automated driving mode is shifted to the manual driving mode, the driving force is controlled based on an override driving force characteristic specifying the target acceleration according to the vehicle speed, the accelerator pedal position, and a traveling resistance to the vehicle, the longitudinal acceleration at a fully closed accelerator pedal position is higher in the override driving force characteristic than in the manual-driving-mode driving force characteristic, and a graph representing a relation between the accelerator pedal position and the longitudinal acceleration in the override driving force characteristic and a graph representing a relation between the accelerator pedal position and the longitudinal acceleration in the manual-driving-mode driving force characteristic intersect at a specific accelerator pedal position different from a fully closed position and a fully opened position.

DETAILED DESCRIPTION

First Embodiment

Hereinafter, a first embodiment of a driving force control device according to the present disclosure will be described. Note that, the present disclosure is not limited to the following embodiments.

Figure 1:
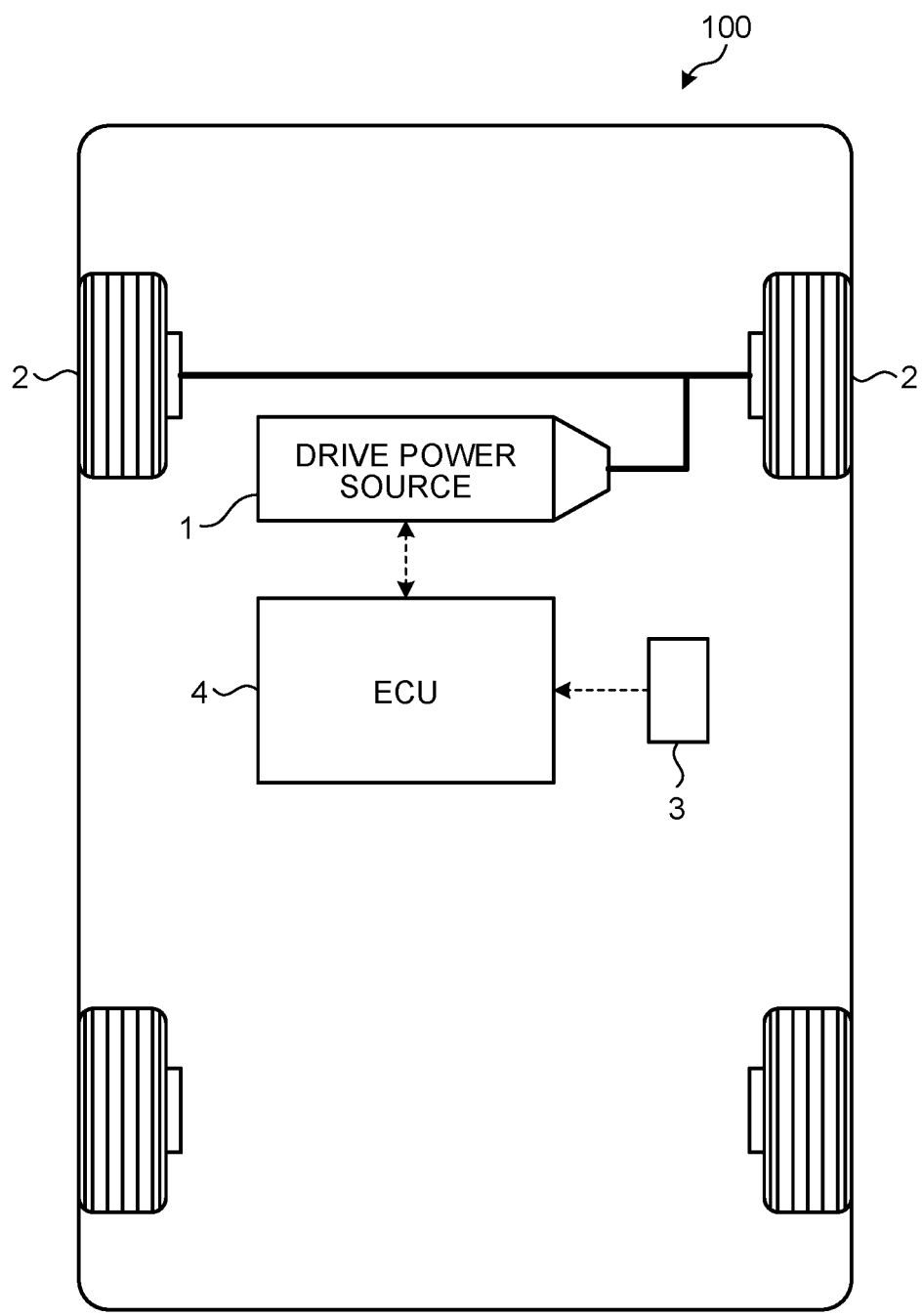
FIG. 1 is a diagram illustrating an example of a gear train and a control system of a vehicle according to a first embodiment.

FIG. 1 is a diagram illustrating an example of a gear train and a control system of a vehicle 100 according to the first embodiment. Similarly to a general related-art vehicle, the vehicle 100 according to the first embodiment is configured to be capable of switching between a manual driving mode in which the vehicle 100 travels according to a driver's driving operation and an automated driving mode in which the vehicle 100 travels by automatically controlling a driving operation without depending on the driver's driving operation. Specifically, as illustrated in FIG. 1, the vehicle 100 includes a drive power source 1, driving wheels 2, an accelerator pedal 3, and an electronic control unit (ECU) 4, as main components.

The drive power source 1 is a power source that outputs driving torque for causing the vehicle 100 to travel. The drive power source 1 is, for example, an internal combustion engine, such as a gasoline engine or a diesel engine, and is configured in such a manner that operating states, such as output adjustment, start, and stop, are electrically controlled. In the case of a gasoline engine, the opening of a throttle valve, a supply amount or an injection amount of fuel, execution and stop of ignition, an ignition timing, and the like are electrically controlled. Alternatively, in the case of a diesel engine, an injection amount of fuel, an injection timing of fuel, the opening of a throttle valve in an EGR system, and the like are electrically controlled.

The drive power source 1 may be, for example, a permanent magnet synchronous motor or an electric motor such as an induction motor. The electric motor in that case may be, for example, what is called a motor-generator having a function as a prime mover that is driven by supply of electric power to output motor torque and a function as a generator that is driven by receiving external torque to generate electricity. In the case of the motor-generator, the rotational speed, the torque, the switching between the function as the prime mover and the function as the generator, and the like are electrically controlled.

The driving wheels 2 generate the driving force by transmission of the driving torque output from the drive power source 1. FIG. 1 illustrates a configuration of a front-wheel drive vehicle in which the front wheels are the driving wheels 2. The vehicle 100 according to the first embodiment may be a rear-wheel drive vehicle in which the rear wheels are the driving wheels or may be a four-wheel drive vehicle in which both the front wheels and the rear wheels are the driving wheels. When an engine is mounted as the drive power source 1, a transmission may be provided on the output side of the engine, and the driving torque output from the drive power source 1 may be increased or decreased by the transmission and transmitted to the driving wheels 2. Each of the wheels including the driving wheels 2 is provided with a braking device. In addition, at least either the front wheels or the rear wheels are provided with a steering device that steers the vehicle 100.

In the vehicle 100, the driving force or the acceleration of the vehicle 100 is controlled based on a driver's acceleration request operation, that is, an operation amount of an accelerator pedal operation (a pressing operation of the accelerator pedal 3 and a returning operation of the accelerator pedal 3) by the driver and the vehicle speed. For example, the ECU 4 sets a target acceleration based on the operation amount of the accelerator pedal 3 or the accelerator pedal position and the vehicle speed and controls the output of the drive power source 1 to achieve the target acceleration.

The accelerator pedal 3 is used to adjust the driving force of the vehicle 100 and control the acceleration of the vehicle 100 by the driver's acceleration request operation. Therefore, the accelerator pedal 3 is provided with an accelerator position sensor for detecting the operation amount of the accelerator pedal 3 by the driver as an internal sensor 13 described later. The operation amount of the accelerator pedal 3 or the accelerator pedal position (an accelerator pedal opening degree, an accelerator pedal pressing angle, or the like) can be detected by the accelerator position sensor.

The ECU 4 is, for example, an electronic control device mainly constituted by a microcomputer. The ECU 4 receives various types of data from an external sensor 11, a GPS reception unit 12, an internal sensor 13, a map database 14, a navigation system 15, and the like, which will be described later. In addition, the ECU 4 can be configured to receive data from an inter-vehicle communication system. The ECU 4 performs calculation using various input data, data and calculation formulas stored in advance, and the like. At the same time, the ECU 4 is configured to output the calculation result as a control command signal to control the vehicle 100.

For example, the ECU 4 acquires various types of data including the accelerator pedal position detected by the accelerator position sensor. At the same time, the ECU 4 calculates a target acceleration or target driving torque of the vehicle 100 based on the acquired various types of data. Then, the ECU 4 controls, based on the calculated target acceleration or target driving torque, the longitudinal acceleration to be generated in the vehicle 100. That is, the ECU 4 outputs a control command signal to control the driving force for achieving the target acceleration.

Therefore, the ECU 4 sets the target acceleration based on the detected accelerator pedal position and controls the driving force and the braking force of the vehicle 100 to achieve the target acceleration. Specifically, the ECU 4 controls the output of the drive power source 1. That is, the ECU 4 performs driving force control of the vehicle 100. Although FIG. 1 illustrates an example in which one ECU 4 is provided, a plurality of ECUs 4 may be provided for each device or equipment to be controlled or for each control content. For example, the ECU 4 may be used as a main controller that integrally controls the vehicle 100, and a sub controller that exclusively controls the drive power source 1, the transmission, and the like in cooperation with the ECU 4 may be separately provided.

The vehicle 100 according to the first embodiment can perform automated driving in which a driving operation of the vehicle 100 is automatically controlled to travel (traveling in an automated driving mode). The automated driving defined in the present embodiment is automated driving in which the control system of the vehicle 100 performs all driving operations, such as recognition of the travel environment, monitoring of the surrounding situation, start/acceleration, steering, and braking/stopping. For example, the automated driving defined in the present embodiment is high automated driving or full automated driving corresponding to "Level 4" in the automation levels established by National Highway Traffic Safety Administration (NHTSA), or "Level 4" and "Level 5" in the automation levels established by Society of Automotive Engineers (SAE) in the United States. For example, as defined by "Level 4" in the automation levels of the SAE, the vehicle 100 may be configured to be able to select an automated driving mode in which the vehicle travels by automated driving and a manual driving mode in which a driver performs a driving operation.

Figure 2:
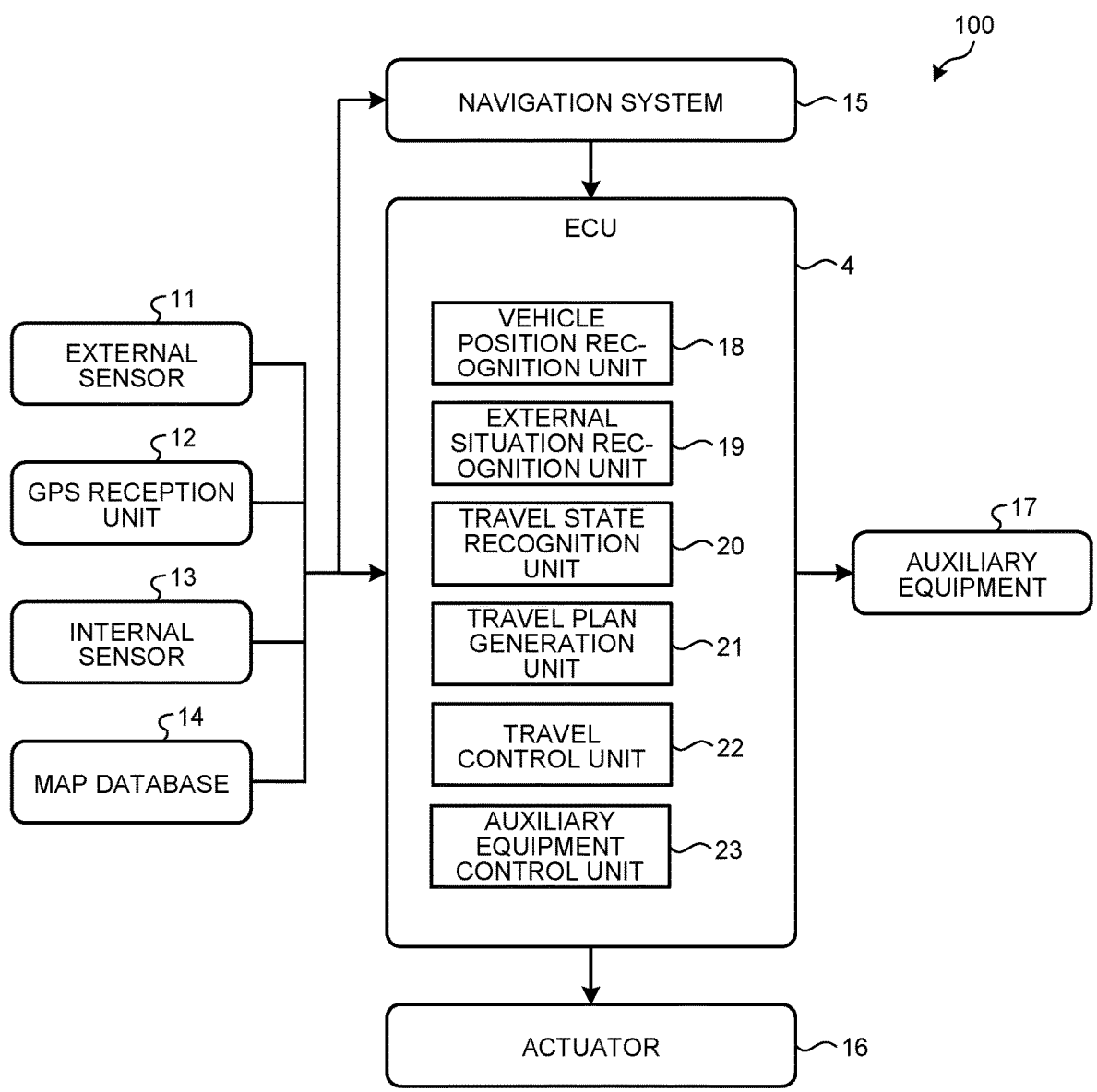
FIG. 2 is a diagram for explaining details of the control system of the vehicle according to the first embodiment.

FIG. 2 illustrates a specific example of the ECU 4 that performs the above automated driving. FIG. 2 is a diagram for explaining details of the control system of the vehicle 100 according to the first embodiment.

The ECU 4 is configured to receive detection signals and information signals from the external sensor 11, the GPS reception unit 12, the internal sensor 13, the map database 14, the navigation system 15, and the like.

The external sensor 11 detects the travel environment and the surrounding situation outside the vehicle 100. As the external sensor 11, an in-vehicle camera, radio detection and ranging (RADAR), laser imaging detection and ranging (LIDAR), an ultrasonic sensor, and the like are provided, for example. As the external sensor 11, all of the above sensors may be provided, or at least one of the above sensors may be provided.

For example, the in-vehicle camera is installed in front of and on a side of the vehicle 100 and transmits imaging information regarding the external situation of the vehicle 100 to the ECU 4. The in-vehicle camera may be a monocular camera or a stereo camera. The monocular camera is smaller in size, lower in cost, and easier to attach to the vehicle 100 as compared with the stereo camera. The stereo camera includes a plurality of imaging units arranged to reproduce binocular parallax. With the imaging information of the stereo camera, information in the depth direction of a recognition target can also be obtained.

The RADAR detects other vehicles, obstacles, and the like outside the vehicle 100 using radio waves, such as millimeter waves and microwaves, and transmits the detection data to the ECU 4. For example, the RADAR is configured to detect other vehicles, obstacles, and the like by radiating radio waves to the surroundings of the vehicle 100 and receiving and measuring/analyzing the radio waves reflected by other vehicles, obstacles, and the like.

The LIDAR (alternatively, a laser sensor or a laser scanner) detects other vehicles, obstacles, and the like outside the vehicle 100 using laser light and transmits the detection data to the ECU 4. For example, the LIDAR is configured to detect other vehicles, obstacles, and the like by emitting laser light to the surroundings of the vehicle 100 and receiving and measuring/analyzing the laser light reflected by other vehicles, obstacles, and the like.

The ultrasonic sensor detects other vehicles, obstacles, and the like outside the vehicle 100 using ultrasonic waves and transmits the detection data to the ECU 4. For example, the ultrasonic sensor is configured to detect other vehicles, obstacles, and the like by radiating ultrasonic waves to the surroundings of the vehicle 100 and receiving and measuring/analyzing the ultrasonic waves reflected by other vehicles, obstacles, and the like.

The GPS reception unit 12 receives radio waves from a plurality of global positioning system (GPS) satellites to measure the position of the vehicle 100 (for example, the latitude and longitude of the vehicle 100) and transmits the position information to the ECU 4.

The internal sensor 13 detects a travel state of the vehicle 100 and an operation state, a behavior, and the like of each unit. The internal sensor 13 includes at least an accelerator position sensor that detects an operation amount of the accelerator pedal 3 or an accelerator pedal position. In addition, the internal sensor 13 mainly includes, for example, a wheel speed sensor that detects a vehicle speed, a rotational speed sensor that detects a rotational speed of an output shaft of the drive power source 1 (a resolver in the case of an electric motor mounted as the drive power source), a throttle opening sensor that detects an opening of a throttle valve, a brake stroke sensor (brake switch) that detects an operation amount (operation state) of a brake pedal, an acceleration sensor that detects the acceleration of the vehicle 100, a steering angle sensor that detects a steering angle of the steering device, and the like. The internal sensor 13 is electrically connected to the ECU 4 and outputs electric signals corresponding to detection values or calculated values of the various sensors, equipment, and devices as described above to the ECU 4 as detection data.

The map database 14 is a database in which map information is accumulated, and is formed in the ECU 4, for example. Alternatively, data stored in a computer at an external facility, such as an information processing center, capable of communicating with the vehicle 100 can also be used.

The navigation system 15 is configured to calculate a traveling route of the vehicle 100 based on the position information of the vehicle 100 measured by the GPS reception unit 12 and the map information of the map database 14.

The detection data and information data from the external sensor 11, the GPS reception unit 12, the internal sensor 13, the map database 14, the navigation system 15, and the like as described above are input to the ECU 4. The ECU 4 is configured to perform calculation using various types of input data, data stored in advance, and the like, and output a control command signal to an actuator 16, auxiliary equipment 17, and the like for each unit of the vehicle 100 based on the calculation result.

The actuator 16 is an operating device involved in driving operations, such as start/acceleration, steering, and braking/stop of the vehicle 100, when the vehicle 100 is caused to travel by automated driving and controls the drive power source 1, the braking device, the steering device, and the like. As the main actuator 16, a throttle actuator, a brake actuator, a steering actuator, and the like are provided, for example.

For example, the throttle actuator is configured to control the opening of a throttle valve of the engine and supply power to the electric motor according to a control signal output from the ECU 4. The brake actuator is configured to operate the braking device according to a control signal output from the ECU 4 to control the braking force applied to each wheel. The steering actuator is configured to drive an assist motor of the electric power steering device according to a control signal output from the ECU 4 to control the steering torque in the steering device.

The auxiliary equipment 17 is equipment or devices that are not included in the actuator 16, such as a windshield wiper, a headlight, a direction indicator, an air conditioner, and an audio device, and are not directly involved in the driving operation of the vehicle 100.

In addition, the ECU 4 includes, for example, a vehicle position recognition unit 18, an external situation recognition unit 19, a travel state recognition unit 20, a travel plan generation unit 21, a travel control unit 22, and an auxiliary equipment control unit 23, as main control units for causing the vehicle 100 to travel in the automated driving mode.

The vehicle position recognition unit 18 is configured to recognize the current position of the vehicle 100 on the map based on the position information of the vehicle 100 received by the GPS reception unit 12 and the map information of the map database 14. Note that the position of the vehicle 100 used in the navigation system 15 can also be obtained from the navigation system 15. Alternatively, if the position of the vehicle 100 can be measured by sensors, sign posts, or the like installed outside on or beside the road, the current position can be obtained by communication with such sensors.

The external situation recognition unit 19 is configured to recognize the external situation of the vehicle 100 based on, for example, the imaging information of the in-vehicle camera or the detection data of RADAR or LIDAR. As the external situation, the position of a traveling lane, the road width, the road shape, the road gradient, information about an obstacle around the vehicle, and the like are obtained, for example. In addition, as the travel environment, weather information around the vehicle 100, a friction coefficient of the road surface, and the like may be detected.

The travel state recognition unit 20 is configured to recognize the travel state of the vehicle 100 based on various types of detection data of the internal sensor 13. As the travel state of the vehicle 100, a vehicle speed, a longitudinal acceleration, a lateral acceleration, a yaw rate, and the like are input, for example.

The travel plan generation unit 21 is configured to generate a course of the vehicle 100 based on, for example, a target route calculated by the navigation system 15, the current position of the vehicle 100 recognized by the vehicle position recognition unit 18, the external situation recognized by the external situation recognition unit 19, and the like. The course is a path along which the vehicle 100 travels along the target route. In addition, the travel plan generation unit 21 generates the course in such a manner that the vehicle 100 can properly travel on the target route according to criteria such as safe traveling, traveling in compliance with laws and regulations, and efficient traveling. Then, the travel plan generation unit 21 is configured to generate a travel plan according to the generated course. Specifically, the travel plan is generated along a preset target route based on at least the external situation recognized by the external situation recognition unit 19 and the map information of the map database 14.

The travel plan is a setting of the travel state of the vehicle including a future driving force request of the vehicle 100, and future data several seconds ahead of the current time is generated, for example. Depending on the external situation or the travel situation of the vehicle 100, future data several tens of seconds ahead of the current time is generated. The travel plan is output from the travel plan generation unit 21 as data indicating changes in the vehicle speed, acceleration, steering torque, and the like when the vehicle 100 travels on the course along the target route, for example.

The travel plan can also be output from the travel plan generation unit 21 as a speed pattern, acceleration pattern, and steering pattern of the vehicle 100. The speed pattern is, for example, data including a target vehicle speed set in association with time for each target control position set at a predetermined interval on the course. The acceleration pattern is, for example, data including a target acceleration set in association with time for each target control position set at a predetermined interval on the course. The steering pattern is, for example, data including a target steering torque set in association with time for each target control position set at a predetermined interval on the course.

The travel control unit 22 is configured to automatically control the traveling of the vehicle 100 based on the travel plan generated by the travel plan generation unit 21. Specifically, a control signal according to the travel plan is output to the actuator 16, such as the throttle actuator, the brake actuator, the steering actuator, and the like. In addition, a control signal according to the travel plan as described above may be output to the drive power source 1.

The auxiliary equipment control unit 23 is configured to automatically control the auxiliary equipment 17 based on the travel plan generated by the travel plan generation unit 21. Specifically, a control signal according to the travel plan is output to the auxiliary equipment 17, such as the windshield wiper, the headlight, the direction indicator, the air conditioner, the audio device, and the like, as necessary.

Note that the control for causing the vehicle 100 to travel in the automated driving mode based on the travel plan as described above is disclosed in, for example, Japanese Laid-open Patent Publication No. 2016-99713. The vehicle 100 is configured to be able to travel in the above-described high automated driving or full automated driving by applying the content described in Japanese Laid-open Patent Publication No. 2016-99713 and other control technologies related to automated driving.

The ECU 4 of the vehicle 100 according to the first embodiment is configured to reflect the driver's intention to accelerate or decelerate, to make it difficult for the driver to feel shocks or discomfort, and to appropriately switch the driving mode from the automated driving mode to the manual driving mode. In the manual driving mode, the ECU 4 performs the driving force control based on a manual-driving-mode driving force characteristic specifying an accelerator pedal position and a longitudinal acceleration of the vehicle 100 to be generated according to the accelerator pedal position as a target acceleration.

For example, when the driver requests acceleration during the automated driving mode, and override is performed, the ECU 4 changes a driving force characteristic from an automated-driving-mode driving force characteristic to an override driving force characteristic based on the vehicle travel state (vehicle speed, traveling resistance (road gradient), and the like) and the driver's intention (an accelerator pedal position (an operation amount of the accelerator pedal 3), movement of the body or eye lines of the driver photographed by the in-vehicle camera or the like included in the internal sensor 13, and the like). The override driving force characteristic specifies the driving force characteristic during the override based on the travel state of the vehicle 100 and the driver's intention. Specifically, the override driving force characteristic specifies the longitudinal acceleration of the vehicle 100 to be generated corresponding to the accelerator pedal position as the target acceleration according to the vehicle speed, the accelerator pedal position (the operation amount of the accelerator pedal 3), and the traveling resistance to the vehicle 100. Therefore, during the override, the target acceleration is calculated based on the override driving force characteristic, and the driving force control of the vehicle 100 is performed by the ECU 4 based on the target acceleration calculated from the override driving force characteristic.

As described above, by changing the driving force characteristic to the override driving force characteristic when the driver requests acceleration during the automated driving mode and the override is performed, it is possible to quickly achieve the vehicle behavior reflecting the driver's intention to accelerate even during the automated driving mode. In particular, when the driver intends to accelerate, it is possible to achieve the vehicle behavior reflecting the driver's intention by arbitrating the automated-driving-mode driving force characteristic in such a manner as not to give a sense of stalling. As a result, it is possible to smoothly start the override.

In the present embodiment, the override driving force characteristic is changed to the manual-driving-mode driving force characteristic based on information about the vehicle speed, the accelerator pedal position, the relation with the manual-driving-mode driving force characteristic, and the like. Accordingly, it is possible to switch from the override driving force characteristic to the manual-driving-mode driving force characteristic without giving the driver a sense of discomfort.

Figure 3:
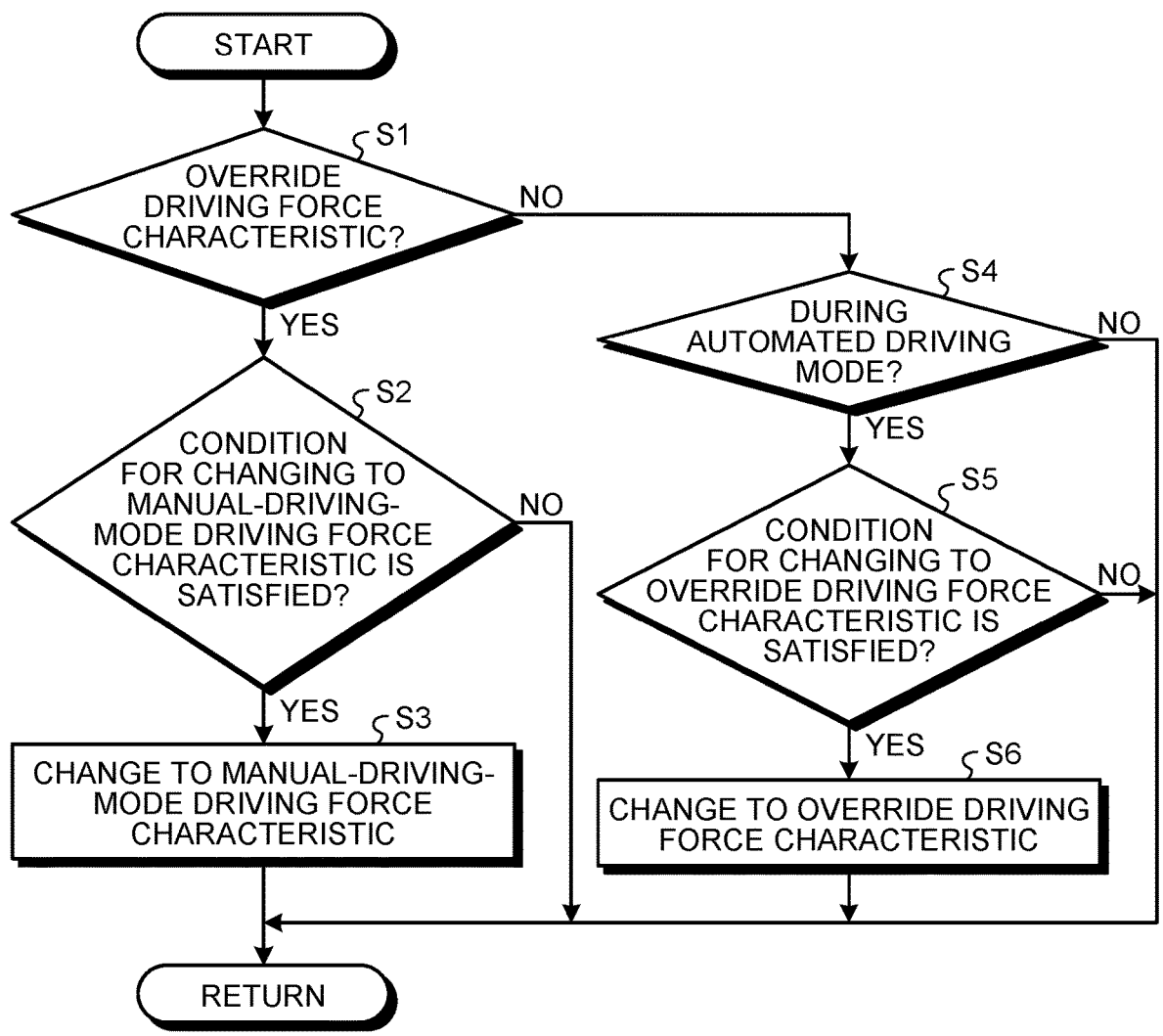
FIG. 3 is a flowchart for explaining an example of control performed by an ECU of the vehicle according to the first embodiment.

FIG. 3 is a flowchart for explaining an example of control performed by the ECU 4 of the vehicle 100 according to the first embodiment. The control illustrated in the flowchart in FIG. 3 is repeatedly performed every several ms when the vehicle 100 travels in the automated driving mode.

First, the ECU 4 determines whether the driving force characteristic is the override driving force characteristic (step S1). When determining that the driving force characteristic is the override driving force characteristic (Yes in step S1), the ECU 4 determines whether a condition for changing to the manual-driving-mode driving force characteristic is satisfied (step S2). When determining that the condition for changing to the manual-driving-mode driving force characteristic is satisfied (Yes in step S2), the ECU 4 changes the driving force characteristic to the manual-driving-mode driving force characteristic (step S3). Thereafter, the ECU 4 returns to a series of control.

When determining in step S2 that the condition for changing to the manual-driving-mode driving force characteristic is not satisfied (No in step S2), the ECU 4 returns to a series of control without changing the driving force characteristic.

When determining in step S1 that the driving force characteristic is not the override driving force characteristic (No in step S1), the ECU 4 determines whether the vehicle 100 is in the automated driving mode (step S4). When determining that the vehicle 100 is in the automated driving mode (Yes in step S4), the ECU 4 determines whether a condition for changing to the override driving force characteristic is satisfied (step S5). When determining that the condition for changing to the override driving force characteristic is satisfied (Yes in step S5), the ECU 4 changes the driving force characteristic to the override driving force characteristic (step S6). Thereafter, the ECU 4 returns to a series of control.

When determining in step S4 that the vehicle 100 is not in the automated driving mode (No in step S4), the ECU 4 controls the vehicle 100 to travel in the normal manual driving mode and returns to a series of control.

When determining in step S5 that the condition for changing to the override driving force characteristic is not satisfied (No in step S5), the ECU 4 does not change the driving force characteristic, controls the vehicle 100 to travel in the normal automated driving mode, and returns to a series of control.

Here, in the present embodiment, the procedure of the processing performed by the ECU 4 in the flowchart in FIG. 3 from "start" to "return" in the order of step S1 (No in step S1), step S4 (Yes in step S4), step S5 (Yes in step S5), and step S6 is defined as Flow 1. In addition, the procedure of the processing performed by the ECU 4 in the flowchart in FIG. 3 from "start" to "return" in the order of step S1 (Yes in step S1), step S2 (Yes in step S2), and step S3 is defined as Flow 2. In addition, the procedure of the processing performed by the ECU 4 from "start" to "return" in the order of step S1 (Yes in step S1) and step S2 (No in step S2) is defined as Flow 3.

Figure 4:
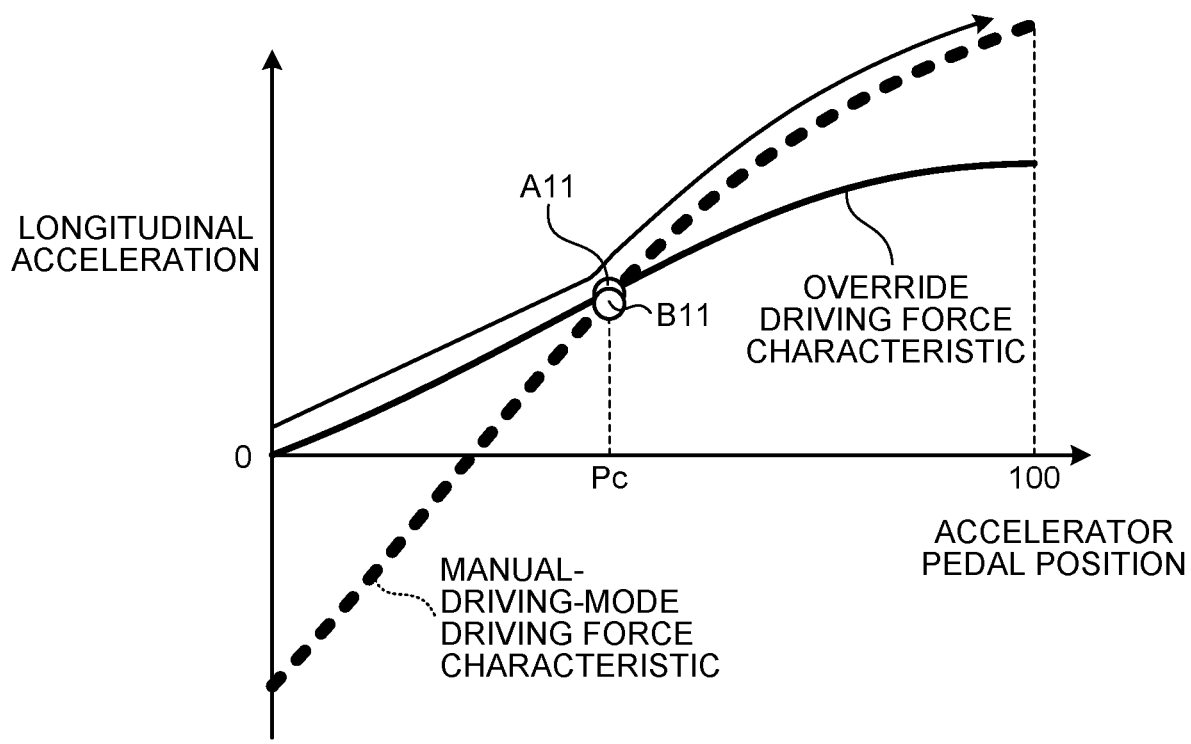
FIG. 4 is a diagram illustrating a relation between an accelerator pedal position and a longitudinal acceleration in an override driving force characteristic and a manual-driving-mode driving force characteristic in the first embodiment.

FIG. 4 is a diagram illustrating a relation between an accelerator pedal position and a longitudinal acceleration in the override driving force characteristic and the manual-driving-mode driving force characteristic in the first embodiment. In FIG. 4, the accelerator pedal position being 0 is the fully closed position (the accelerator opening degree is fully closed), and the accelerator pedal position being 100 is the fully opened position (the accelerator opening degree is fully opened). A point A11 in FIG. 4 indicates a target acceleration based on the override driving force characteristic corresponding to a specific accelerator pedal position Pc at which the override driving force characteristic and the manual-driving-mode driving force characteristic intersect. A point B11 in FIG. 4 indicates a target acceleration based on the manual-driving-mode driving force characteristic corresponding to the specific accelerator pedal position Pc.

In FIG. 4, since the target acceleration values of the point A11 and the point B11 are the same, the point A11 and the point B11 originally overlap each other, but the point A11 and the point B11 are intentionally shifted for easy viewing.

Hereinafter, in the present specification, although the point indicating the target acceleration based on the override driving force characteristic corresponding to the specific accelerator pedal position Pc at which the override driving force characteristic and the manual-driving-mode driving force characteristic intersect and the point indicating the target acceleration based on the manual-driving-mode driving force characteristic originally overlap each other, the points are intentionally shifted for easy viewing.

Figure 5:
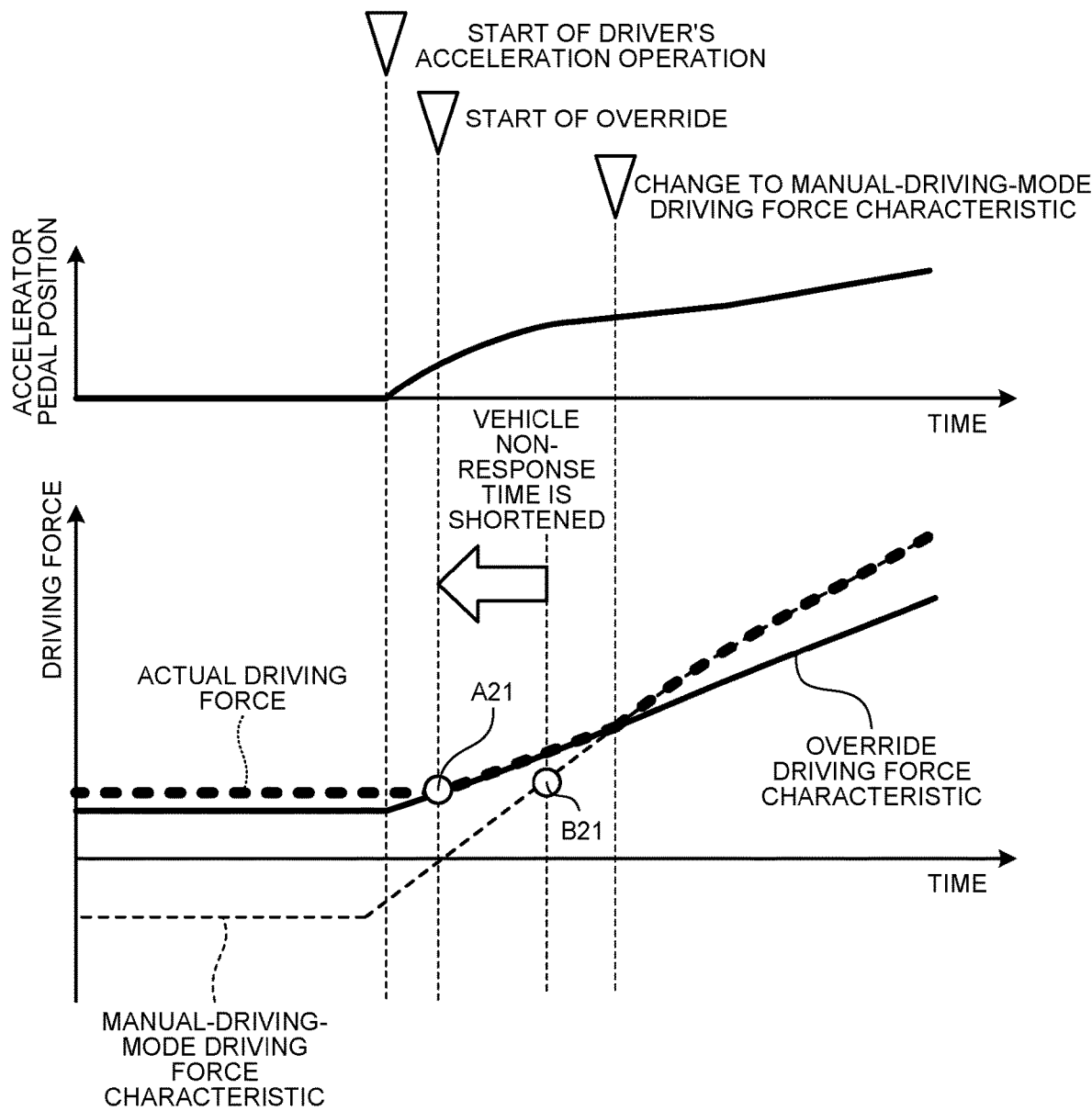
FIG. 5 is an image of time-series behavior in the first embodiment.

FIG. 5 is an image of time-series behavior in the first embodiment. Note that a point A21 in FIG. 5 indicates the driving force based on the override driving force characteristic at the start of the override. A point B21 in FIG. 5 indicates the driving force based on the manual-driving-mode driving force characteristic that matches the actual driving force at the start of the override.

In the present embodiment, in order to facilitate the establishment of Flow 2 in the flowchart in FIG. 3, the override driving force characteristic and the manual-driving-mode driving force characteristic are set in such a manner that the override driving force characteristic and the manual-driving-mode driving force characteristic intersect at the same target acceleration values (the point A11 and the point B11) at the specific accelerator pedal position Pc that is not the fully closed position and the fully opened position, as illustrated in FIG. 4. Then, as illustrated in FIG. 5, the override driving force characteristic is switched to the manual-driving-mode driving force characteristic at a timing when a driving force difference, which is a difference between the target driving force based on the override driving force characteristic (point A21) and the target driving force based on the manual-driving-mode driving force characteristic (point B21), becomes a predetermined value or less. Accordingly, it is possible to control a sudden change in the driving force and change the override driving force characteristic to the manual-driving-mode driving force characteristic without causing the driver to perceive a sense of stalling.

Second Embodiment

Hereinafter, a second embodiment of a driving force control device according to the present disclosure will be described. In the second embodiment, description common to the first embodiment will be omitted as appropriate.

Figure 6:
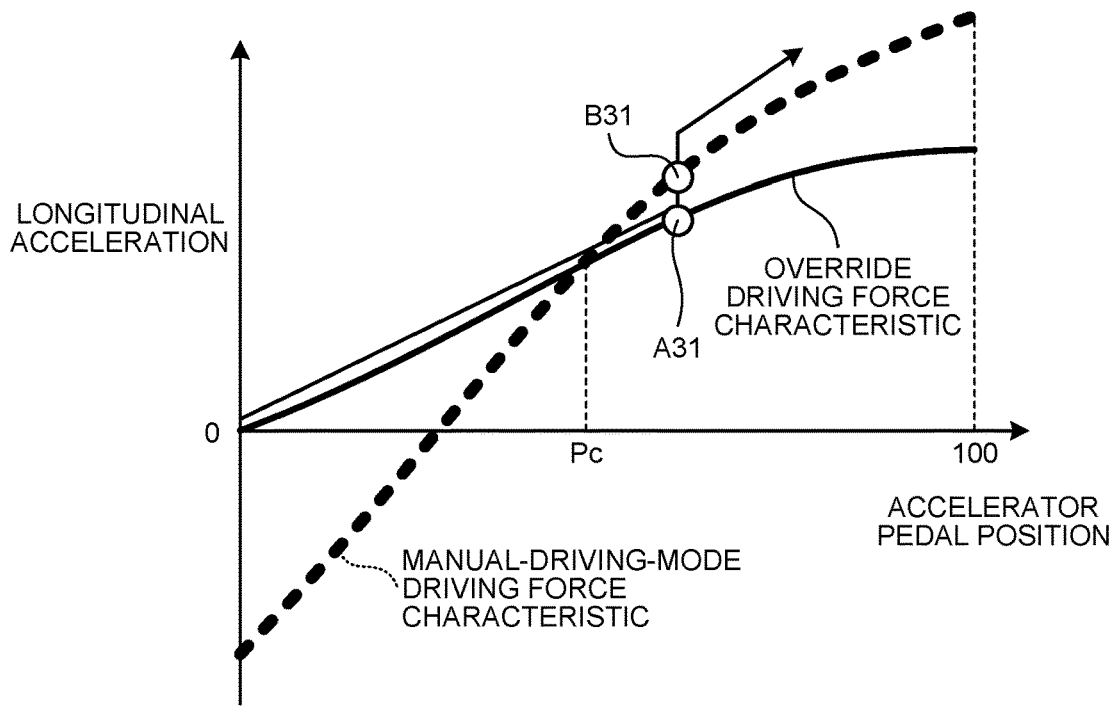
FIG. 6 is a diagram illustrating a relation between an accelerator pedal position and a longitudinal acceleration in an override driving force characteristic and a manual-driving-mode driving force characteristic in a second embodiment.

FIG. 6 is a diagram illustrating a relation between an accelerator pedal position and a longitudinal acceleration in an override driving force characteristic and a manual-driving-mode driving force characteristic in the second embodiment. Note that a point A31 in FIG. 6 indicates a target acceleration based on the override driving force characteristic. A point B31 in FIG. 6 indicates a target acceleration based on the manual-driving-mode driving force characteristic.

In the second embodiment, as illustrated in FIG. 6, when the override driving force characteristic and the manual-driving-mode driving force characteristic intersect, the override driving force characteristic is switched to the manual-driving-mode driving force characteristic at an accelerator pedal position at which a target acceleration B31 based on the manual-driving-mode driving force characteristic is larger than a target acceleration A31 based on the override driving force characteristic, and an acceleration difference, which is a difference between the target acceleration A31 and the target acceleration B31, becomes a predetermined value or less. Accordingly, it is possible to completely eliminate a sense of stalling and change the override driving force characteristic to the manual-driving-mode driving force characteristic.

Third Embodiment

Hereinafter, a third embodiment of a driving force control device according to the present disclosure will be described. In the third embodiment, description common to the first embodiment will be omitted as appropriate.

Figure 7:
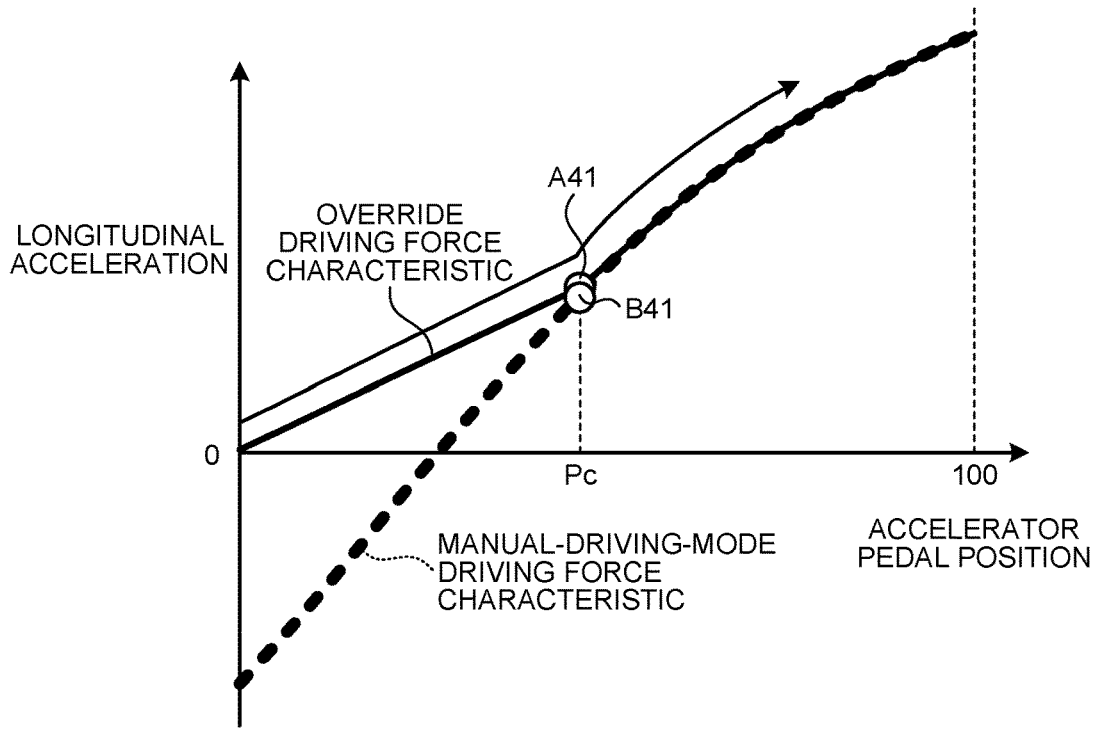
FIG. 7 is a diagram illustrating a relation between an accelerator pedal position and a longitudinal acceleration in an override driving force characteristic and a manual-driving-mode driving force characteristic in a third embodiment.

FIG. 7 is a diagram illustrating a relation between an accelerator pedal position and a longitudinal acceleration in an override driving force characteristic and a manual-driving-mode driving force characteristic in the third embodiment. Note that a point A41 in FIG. 7 indicates a target acceleration based on the override driving force characteristic corresponding to a specific accelerator pedal position Pc at which the override driving force characteristic and the manual-driving-mode driving force characteristic intersect. A point B41 in FIG. 7 indicates a target acceleration based on the manual-driving-mode driving force characteristic corresponding to the specific accelerator pedal position Pc at which the override driving force characteristic and the manual-driving-mode driving force characteristic intersect.

In the third embodiment, as illustrated in FIG. 7, the override driving force characteristic is matched with the manual-driving-mode driving force characteristic on the fully opened side of the accelerator pedal position from the specific accelerator pedal position Pc at which the target acceleration based on the override driving force characteristic (point A41) matches the target acceleration based on the manual-driving-mode driving force characteristic (point B41) are matched and the override driving force characteristic and the manual-driving-mode driving force characteristic intersect. This facilitates switching from the override driving force characteristic to the manual-driving-mode driving force characteristic.

Fourth Embodiment

Hereinafter, a fourth embodiment of a driving force control device according to the present disclosure will be described. In the fourth embodiment, description common to the first embodiment will be omitted as appropriate.

Figure 8:
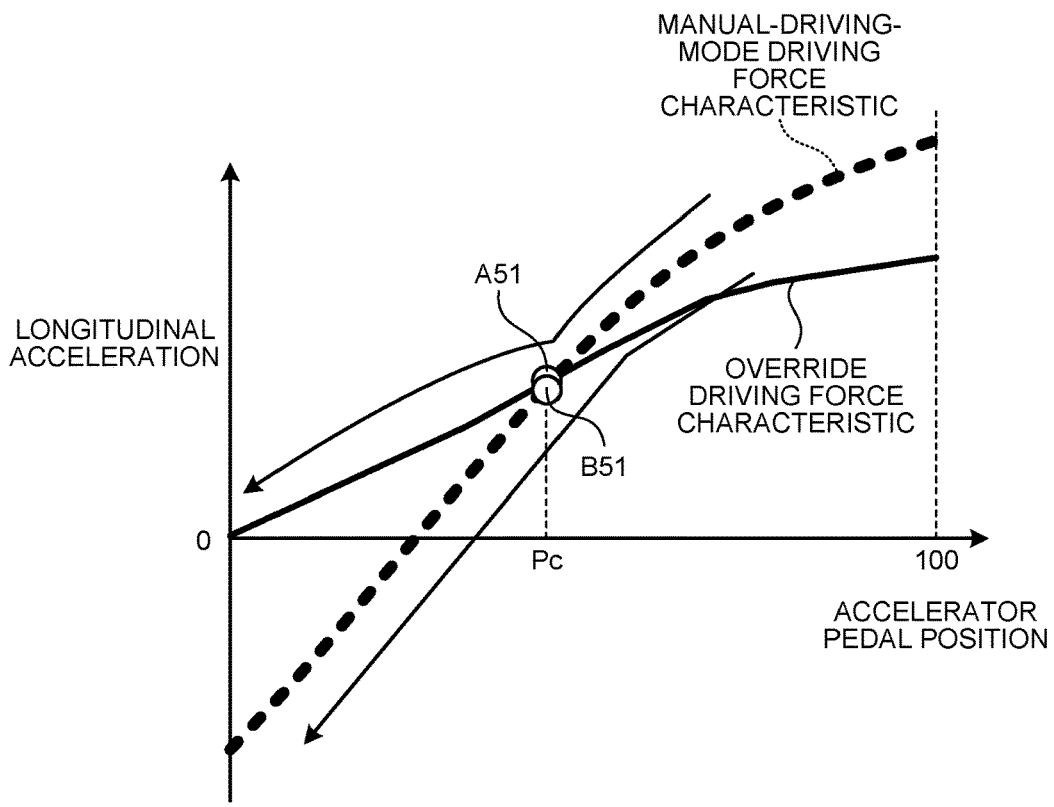
FIG. 8 is a diagram illustrating a relation between an accelerator pedal position and a longitudinal acceleration in an override driving force characteristic and a manual-driving-mode driving force characteristic in a fourth embodiment.

FIG. 8 is a diagram illustrating a relation between an accelerator pedal position and a longitudinal acceleration in an override driving force characteristic and a manual-driving-mode driving force characteristic in the fourth embodiment. Note that a point A51 in FIG. 8 indicates a target acceleration based on the override driving force characteristic corresponding to a specific accelerator pedal position Pc at which the override driving force characteristic and the manual-driving-mode driving force characteristic intersect. A point B51 in FIG. 8 indicates a target acceleration based on the manual-driving-mode driving force characteristic corresponding to the specific accelerator pedal position Pc at which the override driving force characteristic and the manual-driving-mode driving force characteristic intersect.

In the fourth embodiment, as illustrated in FIG. 8, after the change from the override driving force characteristic to the manual-driving-mode driving force characteristic is completed by pressing the accelerator pedal 3 on the fully opened side from the specific accelerator pedal position Pc at which the target acceleration based on the override driving force characteristic (point A51) and the target acceleration based on the manual-driving-mode driving force characteristic (point B51) are matched and the override driving force characteristic and the manual-driving-mode driving force characteristic intersect (flow 2 is established), whether the override driving force characteristic or the manual-driving-mode driving force characteristic is used on the fully opened side from the specific accelerator pedal position Pc in during a driver's return operation of the accelerator pedal 3 may be determined according to the character of a vehicle 100 (a sport car, popular car, taxi, or the like).

Figure 9:
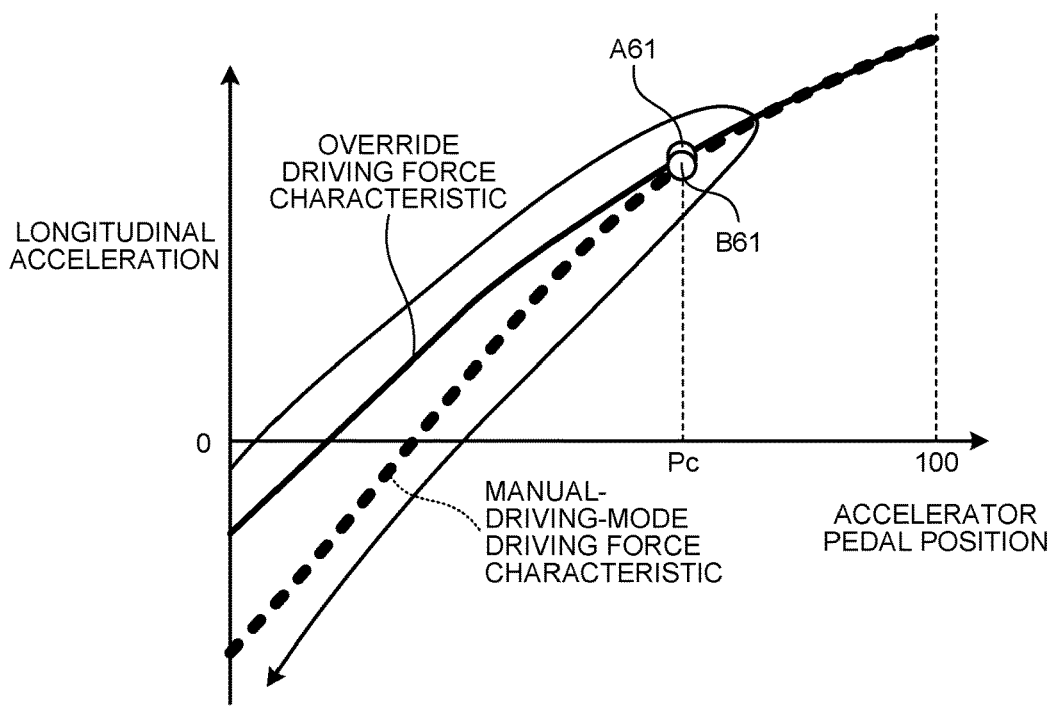
FIG. 9 is a diagram illustrating a case where the manual-driving-mode driving force characteristic is used on a fully closed side from a specific accelerator pedal position during a driver's return operation of an accelerator pedal after the change from the override driving force characteristic to the manual-driving-mode driving force characteristic is completed.

FIG. 9 is a diagram illustrating a case where the manual-driving-mode driving force characteristic is used on the fully closed side from the specific accelerator pedal position Pc during the driver's return operation of the accelerator pedal after the change from the override driving force characteristic to the manual-driving-mode driving force characteristic is completed. Note that a point A61 in FIG. 9 indicates a target acceleration based on the override driving force characteristic corresponding to the specific accelerator pedal position Pc at which the override driving force characteristic and the manual-driving-mode driving force characteristic intersect. A point B61 in FIG. 9 indicates a target acceleration based on the manual-driving-mode driving force characteristic corresponding to the specific accelerator pedal position Pc at which the override driving force characteristic and the manual-driving-mode driving force characteristic intersect.

Figure 10:
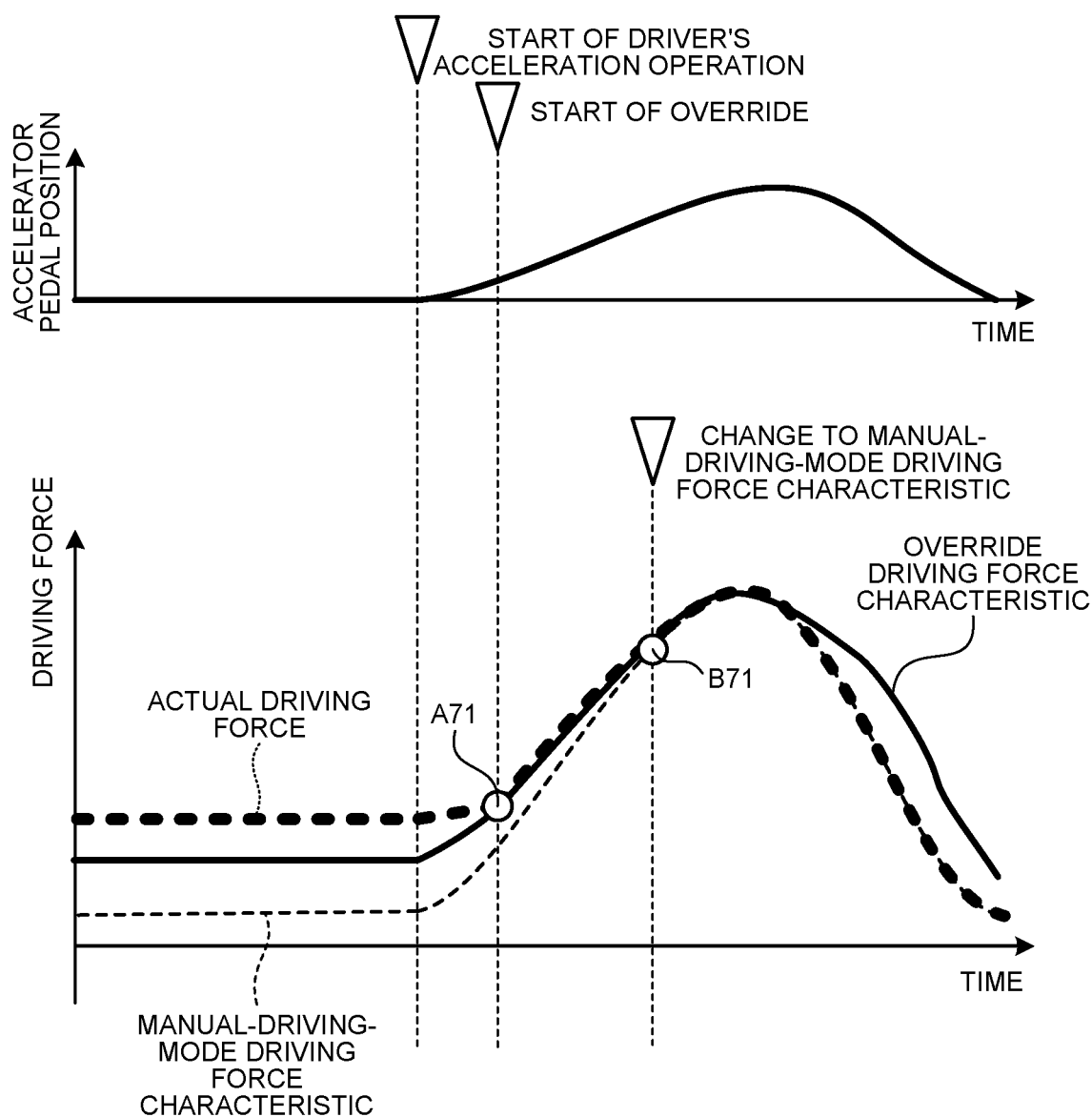
FIG. 10 is an image of time-series behavior in a case where the manual-driving-mode driving force characteristic is used on a fully closed side from a specific accelerator pedal position during a driver's return operation of an accelerator pedal after the change from the override driving force characteristic to the manual-driving-mode driving force characteristic is completed.

FIG. 10 is an image of time-series behavior in a case where the manual-driving-mode driving force characteristic is used on the fully closed side from the specific accelerator pedal position Pc during driver's return operation of the accelerator pedal after the change from the override driving force characteristic to the manual-driving-mode driving force characteristic is completed. Note that a point A71 in FIG. 10 indicates the driving force based on the override driving force characteristic at the start of the override. A point B71 in FIG. 10 indicates the driving force based on the manual-driving-mode driving force characteristic when the driving force characteristic is changed to the manual-driving-mode driving force characteristic.

For example, if the vehicle 100 is a popular car or a taxi, by actively using the manual-driving-mode driving force characteristic on the fully closed side from the specific accelerator pedal position Pc during the driver's return operation of the accelerator pedal after the change from the override driving force characteristic to the manual-driving-mode driving force characteristic is completed, it is possible to achieve a milder vehicle behavior, as illustrated in FIGS. 9 and 10.

Fifth Embodiment

Hereinafter, a fifth embodiment of a driving force control device according to the present disclosure will be described. In the fifth embodiment, description common to the first embodiment will be omitted as appropriate.

Figure 11:
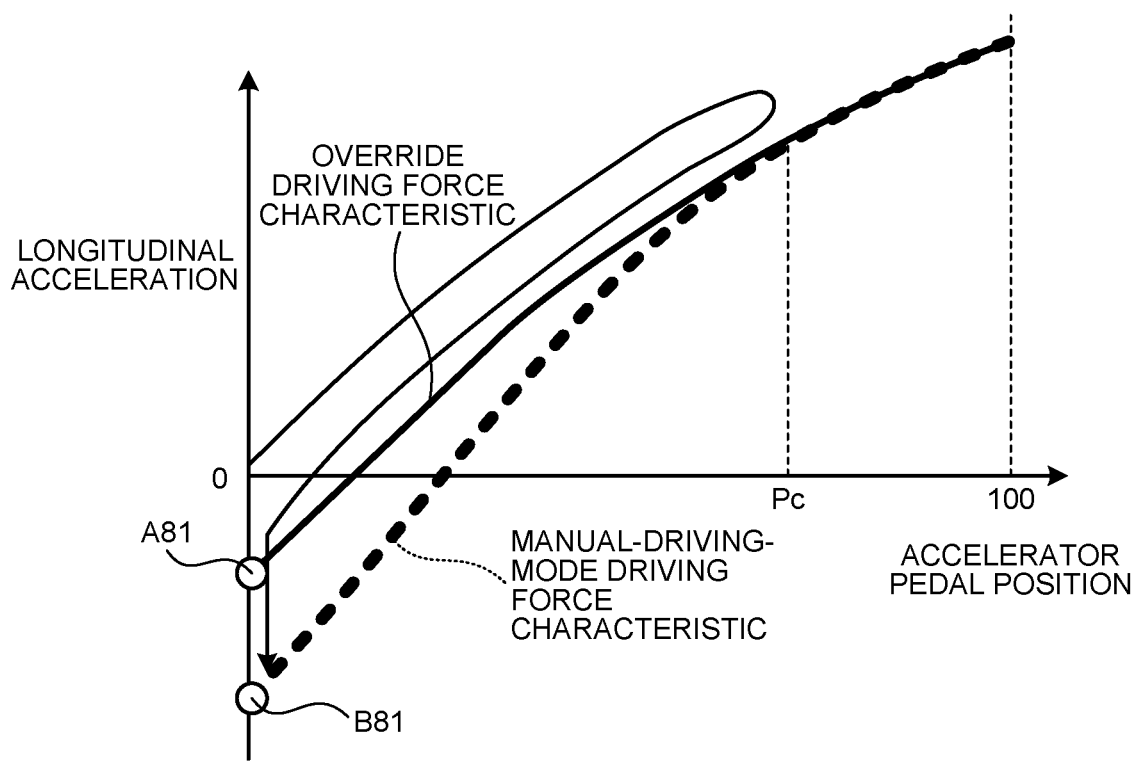
FIG. 11 is a diagram illustrating a relation between an accelerator pedal position and a longitudinal acceleration in an override driving force characteristic and a manual-driving-mode driving force characteristic in a fifth embodiment.

FIG. 11 is a diagram illustrating a relation between an accelerator pedal position and a longitudinal acceleration in an override driving force characteristic and a manual-driving-mode driving force characteristic in the fifth embodiment. In FIG. 11, the override driving force characteristic and the manual-driving-mode driving force characteristic intersect at a specific accelerator pedal position Pc different from the fully closed position and the fully opened position. In addition, a point A81 in FIG. 11 indicates a target acceleration based on the override driving force characteristic corresponding to the fully closed accelerator pedal position. A point B81 in FIG. 11 indicates a target acceleration based on the manual-driving-mode driving force characteristic corresponding to the fully closed accelerator pedal position.

Figure 12:
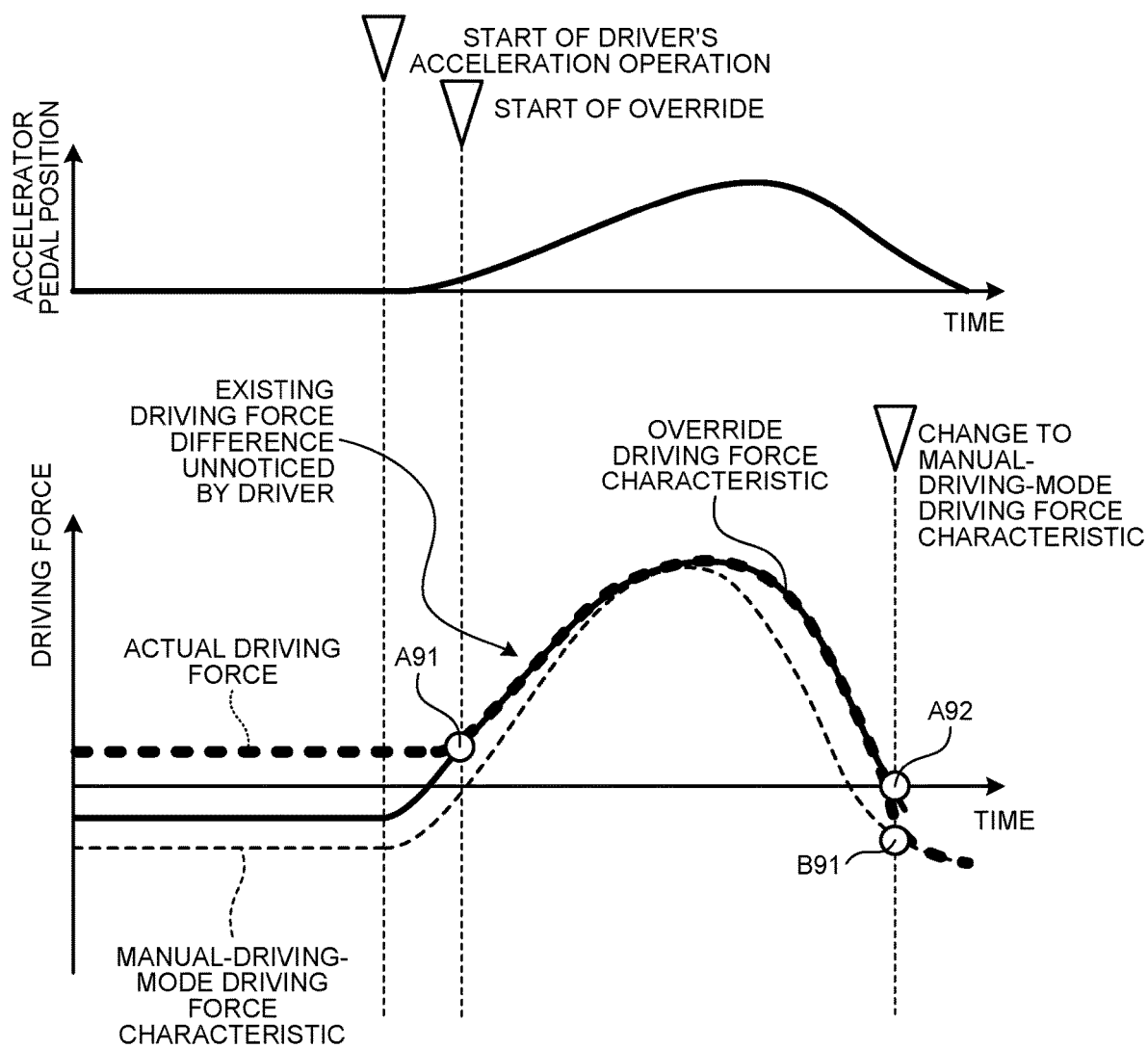
FIG. 12 is an image of time-series behavior in the fifth embodiment.

FIG. 12 is an image of time-series behavior in the fifth embodiment. Note that a point A91 in FIG. 12 indicates the driving force based on the override driving force characteristic at the start of the override. A point A92 in FIG. 12 indicates the driving force based on the override driving force characteristic when the driving force characteristic is changed to the manual-driving-mode driving force characteristic. A point B91 in FIG. 12 indicates the driving force based on the manual-driving-mode driving force characteristic when the driving force characteristic is changed to the manual-driving-mode driving force characteristic.

In the fifth embodiment, as illustrated in FIGS. 11 and 12, the condition for changing the override driving force characteristic to the manual-driving-mode driving force characteristic in Flow 2 in the flowchart in FIG. 3 is that the accelerator pedal position is at or near the fully closed position. Accordingly, it is assumed that the override is not completed until the accelerator pedal position is returned to the fully closed accelerator pedal position depending on the travel state of a vehicle 100, but it is possible to change the override driving force characteristic to the manual-driving-mode driving force characteristic even in such a case.

A driving force control device according to the present disclosure facilitates switching from the automated driving mode to the manual driving mode in a state where the driving force difference between an override driving force characteristic and a manual-driving-mode driving force characteristic is small, and has an effect of controlling a sudden change in the driving force.

According to an embodiment, it is possible to facilitate switching from the automated driving mode to the manual driving mode in a state where the driving force difference between the override driving force characteristic and the manual-driving-mode driving force characteristic is small, and it is possible to control a sudden change in the driving force.

According to an embodiment, it is possible to facilitate switching from the override driving force characteristic to the manual-driving-mode driving force characteristic.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving force control device comprising:
a processor configured to
cause a vehicle to travel by switching between a manual driving mode for controlling a driving force of the vehicle based on a manual-driving-mode driving force characteristic specifying a vehicle speed, an accelerator pedal position, and a longitudinal acceleration of the vehicle to be generated according to the accelerator pedal position as a target acceleration, and an automated driving mode for controlling the driving force by automatic control without depending on an accelerator pedal operation by a driver, and
change, when the automated driving mode is shifted to the manual driving mode, the driving force from a driving force generated in the automated driving mode to a driving force generated in the manual driving mode, wherein
when the automated driving mode is shifted to the manual driving mode, the driving force is temporarily controlled based on an override driving force characteristic before being controlled based on the manual-driving-mode driving force characteristic,
the override driving force characteristic specifies the target acceleration according to the vehicle speed, the accelerator pedal position, and a traveling resistance to the vehicle,
the longitudinal acceleration at a fully closed accelerator pedal position is higher in the override driving force characteristic than in the manual-driving-mode driving force characteristic, and
a graph representing a relation between the accelerator pedal position and the longitudinal acceleration in the override driving force characteristic and a graph representing a relation between the accelerator pedal position and the longitudinal acceleration in the manual-driving-mode driving force characteristic intersect at a specific accelerator pedal position different from the fully closed accelerator pedal position and a fully opened accelerator pedal position.

2. The driving force control device according to claim 1, wherein the longitudinal acceleration in the override driving force characteristic and the longitudinal acceleration in the manual-driving-mode driving force characteristic are matched at an accelerator pedal position on a fully opened side from the specific accelerator pedal position.

* * * * *